(No Model.) 8 Sheets—Sheet 1.
J. H. HASKINS.
BOLT THREADING AND POINTING MACHINE.
No. 556,054. Patented Mar. 10, 1896.

Fig. 1

(No Model.) 8 Sheets—Sheet 3.

J. H. HASKINS.
BOLT THREADING AND POINTING MACHINE.

No. 556,054. Patented Mar. 10, 1896.

WITNESSES:
John M. Culver.
E. E. Clinton

INVENTOR
James H. Haskins
BY R. B. Swift
ATTORNEY.

(No Model.) 8 Sheets—Sheet 5.

J. H. HASKINS.
BOLT THREADING AND POINTING MACHINE.

No. 556,054. Patented Mar. 10, 1896.

WITNESSES:
John M. Culver
E. E. Clinton

INVENTOR
James H. Haskins
BY R. B. Swift
ATTORNEY.

(No Model.) 8 Sheets—Sheet 6.
J. H. HASKINS.
BOLT THREADING AND POINTING MACHINE.

No. 556,054. Patented Mar. 10, 1896.

WITNESSES:
John M. Culver
E. E. Clinton

INVENTOR
James H. Haskins
BY P. B. Swift
ATTORNEY.

(No Model.) 8 Sheets—Sheet 7.
J. H. HASKINS.
BOLT THREADING AND POINTING MACHINE.
No. 556,054. Patented Mar. 10, 1896.

WITNESSES:
John M Culver
E. E. Clinton

INVENTOR
James H. Haskins
BY P. B. Swift
ATTORNEY.

(No Model.) 8 Sheets—Sheet 8.

J. H. HASKINS.
BOLT THREADING AND POINTING MACHINE.

No. 556,054. Patented Mar. 10, 1896.

Fig. 23

WITNESSES:
John M. Culver
E. E. Clinton

INVENTOR
James H. Haskins
BY R. B. Swift
ATTORNEY.

UNITED STATES PATENT OFFICE.

JAMES H. HASKINS, OF CHICAGO, ILLINOIS.

BOLT THREADING AND POINTING MACHINE.

SPECIFICATION forming part of Letters Patent No. 556,054, dated March 10, 1896.

Application filed November 7, 1894. Serial No. 528,129. (No model.)

*To all whom it may concern:*

Be it known that I, JAMES H. HASKINS, a citizen of the United States, residing at Chicago, in the county of Cook, in the State of Illinois, have invented a new and useful Automatic Machine for Cutting Threads and Pointing Blanks, of which the following is a specification.

The object of my invention is to produce a machine that will automatically cut the threads upon bolts and screws and point them without further attention from the operator than the shoveling of the material upon which the threads are to be cut into a hopper on the machine.

It is in the arrangement, simplicity, and practicability of the different devices which I have arranged and combined to do the work, in their adjustability, and in the safety appliances provided, all of which automatically operate, that my invention consists.

The devices of the machine will be hereinafter described, and they are illustrated in the drawings, in which—

Similar letters will refer to similar parts throughout the several views.

The operative parts of the machine are mounted upon a framework A, which is of sufficient height to be convenient for attendance by the operator and stable enough to insure the operative parts of the machine working properly.

Figure 1:
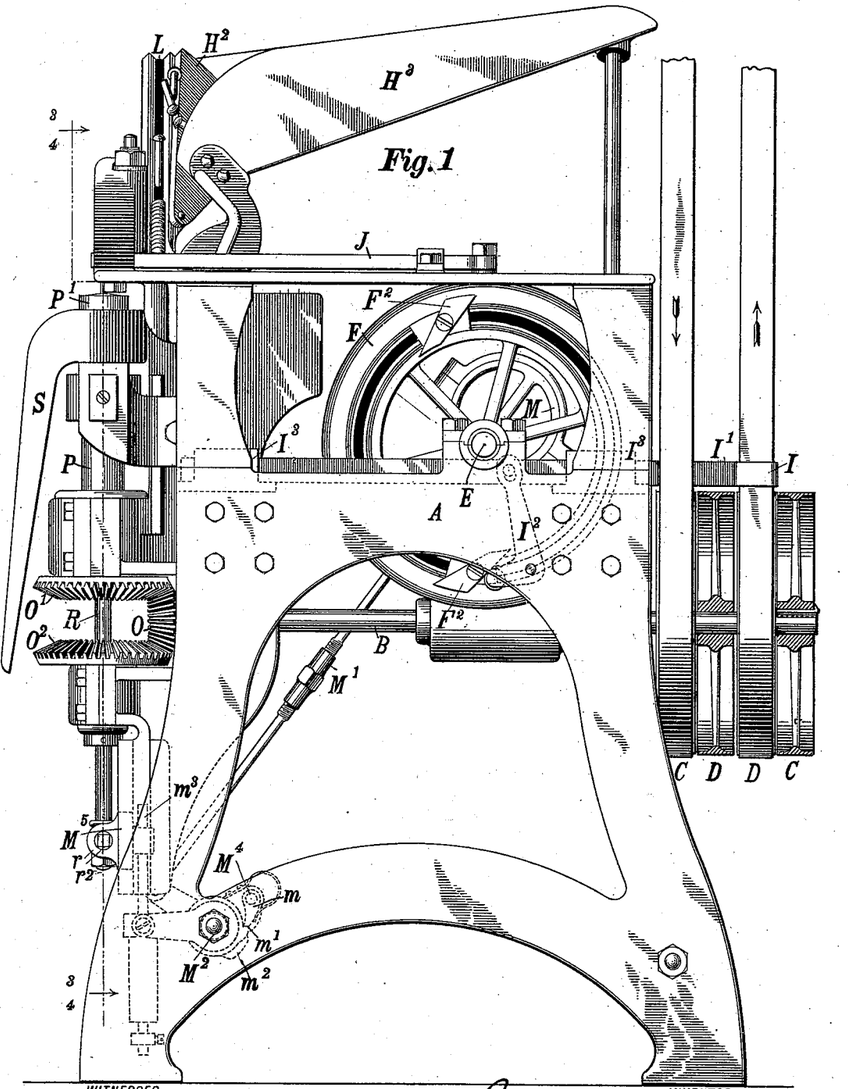
Figure 1 is a side view of the machine, showing the belt-shifting devices in dotted lines, also the loose and keyed pulleys. The view is taken at the time the cutting of a thread and the pointing have been completed and the belt for advancing has been thrown onto a loose pulley and the belt for withdrawing onto a keyed one.

Power is transmitted to the machine through a main shafting B, and as the die must have a reverse motion to free itself from the thread tight pulleys C and loose pulleys D are mounted on this shaft and motion is transmitted to them by the oppositely-running belts, as shown in Fig. 1.

Upon the framework A, at right angles to the main shaft B, is mounted a cross-shaft E, which carries a cam-wheel F, crank H, and eccentric G. Motion is transmitted to the shaft E and the parts mounted upon it by means of worm-gearing, a worm $f$ being keyed to the main shaft B and meshing with the teeth $f'$ on one edge of the periphery of the cam-wheel F.

I will now proceed to describe the devices operated by the parts on the cross-shaft E and will first take up the belt-shifting mechanism.

Figures 9, 10, 11, 12, 13:
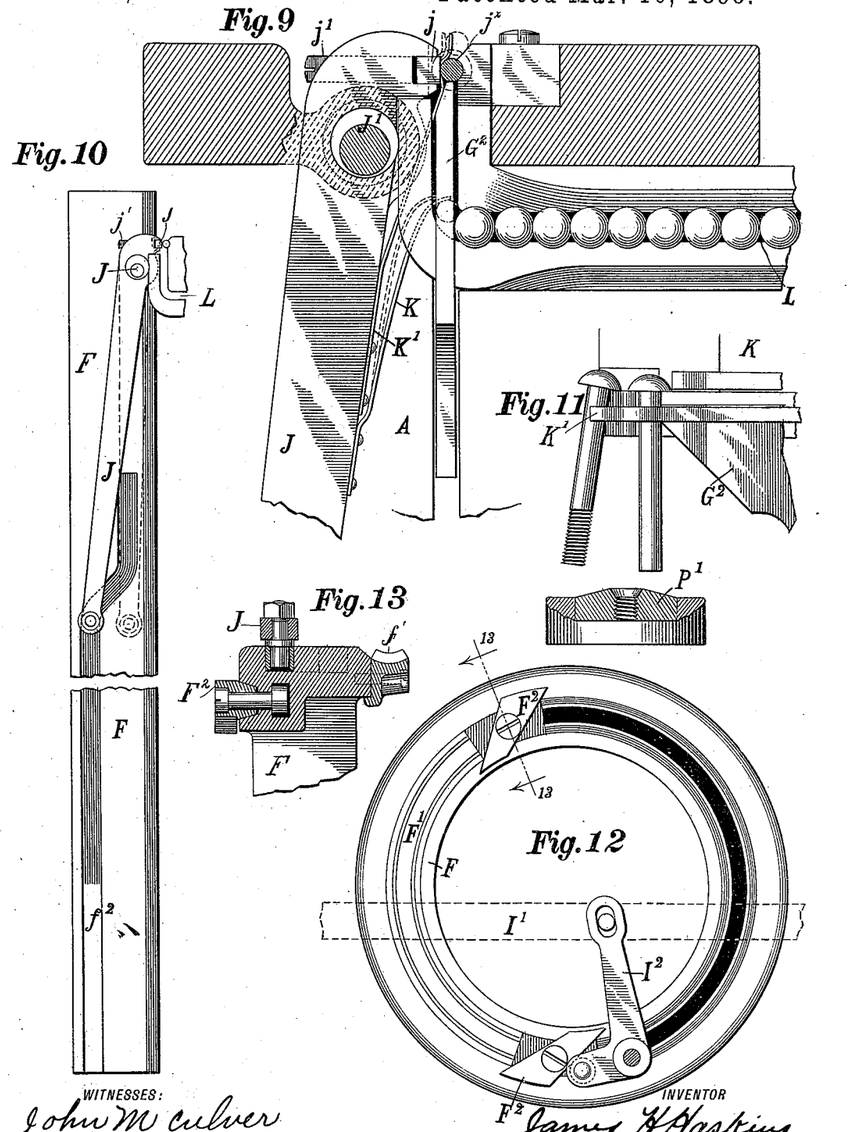
Fig. 9 is a sectional plan view showing the bolt-slide, the bolt-feed, and the eccentrically-set pinch-lever, and adjustable hardened jaws, also the retaining-springs.
Fig. 10 is a diagram of the pinch-lever and its cam, the shaded part of the latter representing the portion used in cutting the length of thread shown in these drawings.
Fig. 11 shows the spring crowding the discharging finished bolt along the beveled end of the slot, so it will drop outside of the thread-die.
Fig. 12 shows the belt-shifting cam, a portion shaded representing the part used to cause the mechanism to be actuated to produce the length of thread shown in the drawings. The adjustable stops are also shown, which, when changed, enable the machine to cut threads of different lengths.
Fig. 13 is a sectional view on line 13 13 of Fig. 12, showing the manner of fixing the stops, and also the manner of attaching the worm-wheel to the cam-wheel.

As before remarked, it is necessary in this machine, after the thread has been cut, to back the die off the thread, and this I accomplish by means of the oppositely-running belts working upon tight and loose pulleys that are mounted upon the main shaft B. These belts run through guides I, one for each belt, which guides are attached to a reciprocating arm I', that extends parallel with the face of the cam-wheel F and reciprocates in guideways I$^3$, that are attached to the frame of the machine. There is shown in Fig. 12 an enlarged detail of the face of the cam-wheel F, in which there is a slot F', and fastened in this slot are the diagonal stops F$^2$ F$^2$, which as the wheel F rotates strike against one arm of the bell-crank lever I$^2$, pivoted on the main frame of the machine, the other arm of which extends to the belt-guiding arm I'. One of these stops throws the belt in one direction, and the other reverses the movement. The position of the stops on the wheel can be varied to suit the work being done, it being plain that the position of the stops controls the time that the machine moves forwardly and backwardly.

Figures 2, 6, 7, 8:
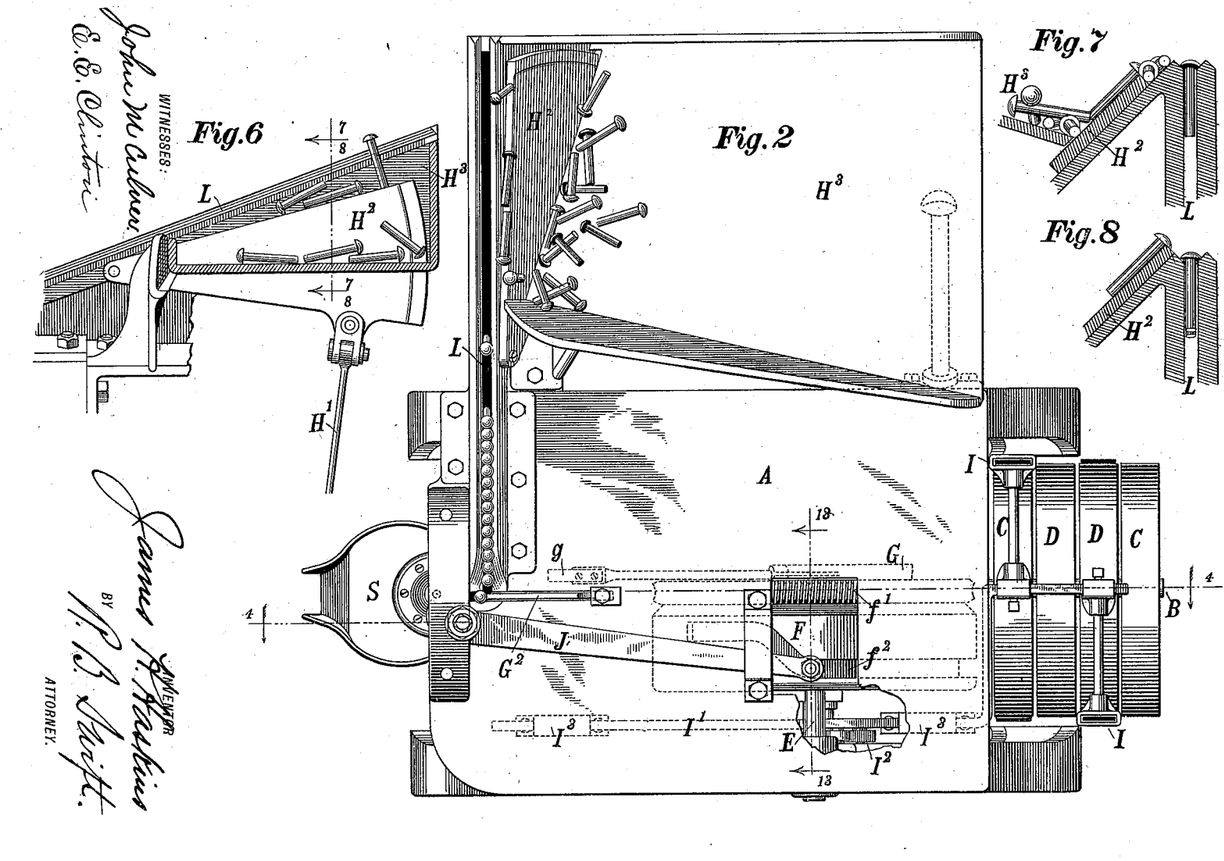
Fig. 2 is a plan view showing by means of dotted lines and the partial breaking away of the table of the machine the cam that moves the pinch-lever and the belt-shifting device, together with the feed device.
Fig. 6 is a view perpendicularly upon the pivoted feed-slide in the hopper, the hopper being shown partly in section.
Figs. 7 and 8 are vertical sectional views of the feed-slide and hopper, showing the slide advancing and as it has completed its movements.
Figure 4:
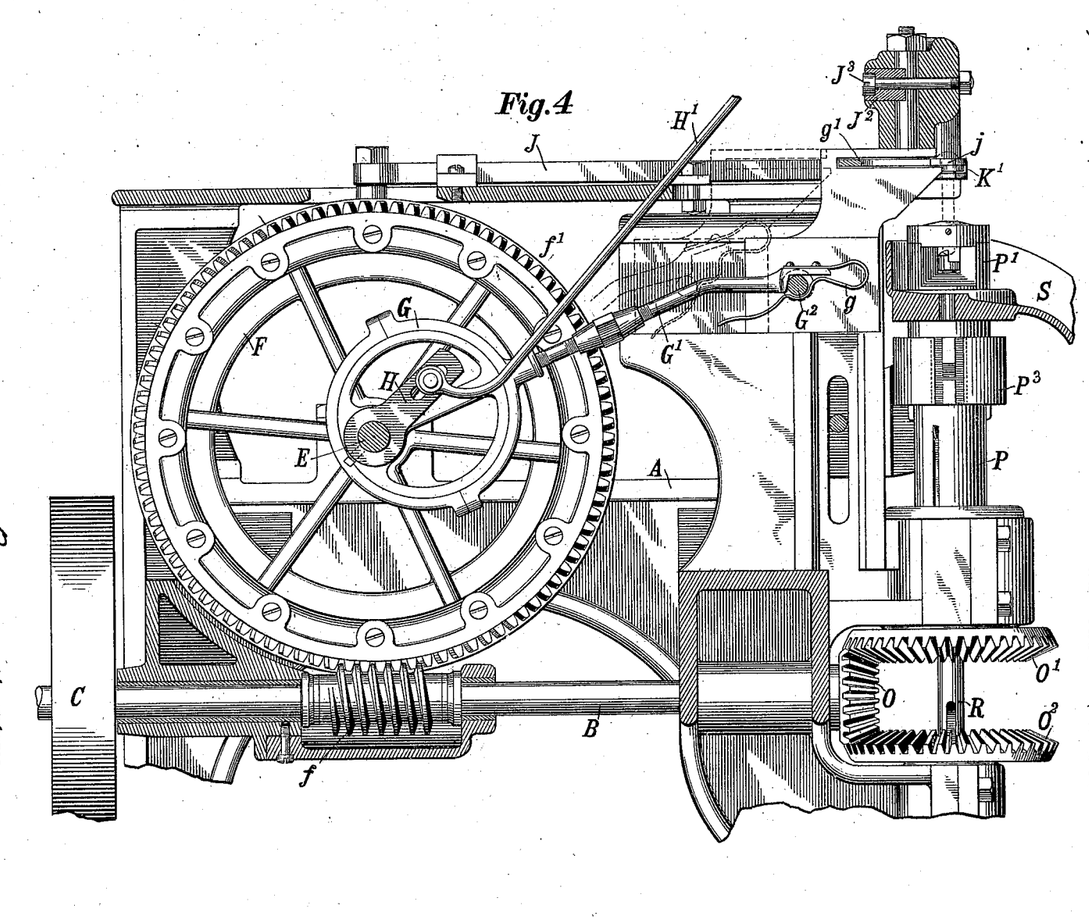
Fig. 4 is a longitudinal vertical view on line 4 4 of Fig. 2 in the plane of the thread-cutting head, so far as concerns the frame, but showing in full certain parts to the front of this plane—as, for instance, the feed-sleeve and the automatic bolt-feed and safety device.

In the face of the periphery of the cam-wheel F is a cam-slot $f^2$, Fig. 2, which actuates a pinch-lever J, that is pivoted to the frame of the machine just above the thread-cutting die. One arm of this pinch-lever is fitted with a roller and is held in place by means of a clamp, so that the roller on the lever is held in the cam-groove and actuated by it. The pinch-lever J is eccentrically mounted on stud J', secured to the frame of the machine, as is shown in Fig. 9 of the drawings, and its pinching-arm is fitted with a hardened block $j$, which is adjustable by means of the set-screw $j'$. The eccentric-stud J' can be positioned in its bearing on the machine-frame by the jam-nut with which it is fitted. In order, however, that this adjustment may be made with much nicety, a jam-block J$^2$, Fig. 4, is set into the frame of the machine to bear against the stud of the eccentric, and a bolt J$^3$ holds this jam-block tightly against the eccentric-stud. When the proper position of the eccentric has been found, so that just the right pinch upon the bolt to be threaded is obtained, the bolt J$^3$, through the jam-block, is tightened and the eccentric is fastened in place. The nut then upon the eccentric-stud can be drawn up without disturbing the position of the eccentric, while the conjoint action of the two methods of fastening holds the eccentric firmly in position. There are also fastened upon the pinch-lever retaining-springs K K', Fig. 9. The spring K is at the end of the downwardly-trending bolt-carrying slot and prevents the bolts from sliding down too rapidly, while the spring K' holds the bolt in position to be pinched by the pinch-lever against an oppositely-hardened jaw on the machine-frame preparatory to being threaded.

Figures 19, 20, 22:
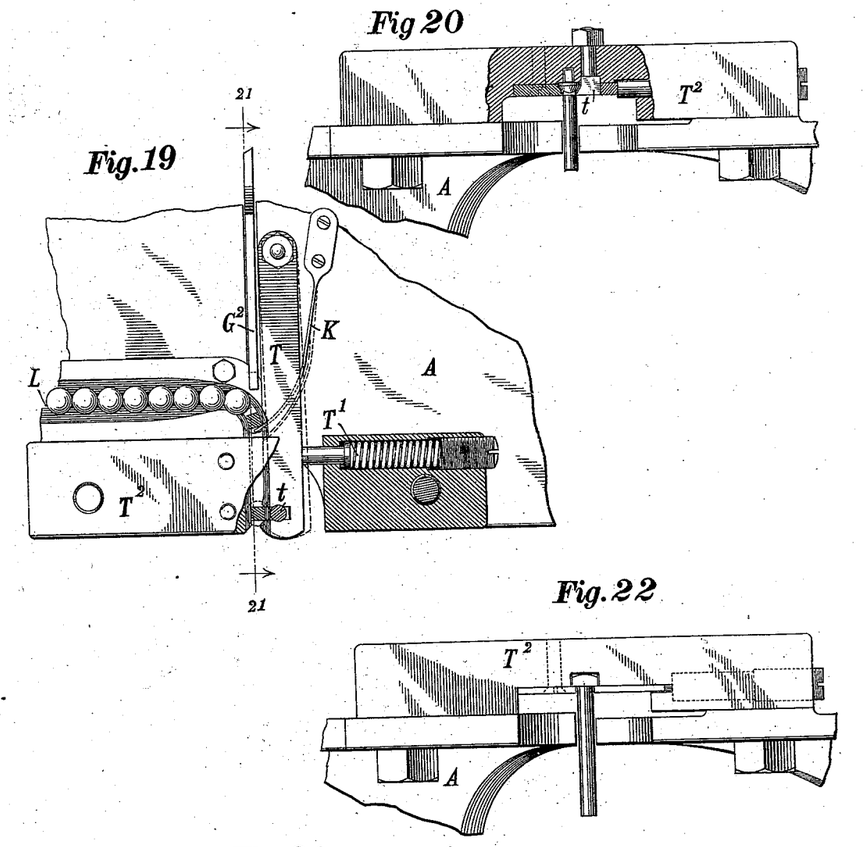
Fig. 19 is a plan view of a modified form of a lever for holding a round-headed square-shank bolt.
Fig. 20 is a vertical, partly sectional, view of the modification shown in Fig. 19, a portion being broken away to more clearly show the construction.
Fig. 22 is another modified form showing the holding device used for square-headed bolts.

While the motions of the pinch-lever are such as to conduce to the action of the springs, still they could be fastened to the framework of the machine, as shown in Fig. 19, and perform the office for which they are intended. The spring K' has another important office than the one already specified, which is to assist in the discharge of the finished bolt. As the bolt to be operated upon is advanced it pushes the finished bolt outward, so that the spring acting upon it jams it against the beveled discharging-guide $j^\times$ on the frame and thus causes it to drop free of the working parts. Also mounted upon the cross-shaft E is an eccentric G, which actuates the adjustable feed-pitman G'. This pitman is connected to a slotted feed-slide G$^2$ by means of a safety connection consisting of a shoulder upon the pitman, against which a stud on the feed-slide is held by means of a strong spring $g$, as shown in Fig. 4. In dotted lines in the same figure the stud in the feed-slide is shown escaping from the shoulder of the pitman, as it does when for any reason a bolt clogs the feed-slide. The slot $g'$ in the feed-slide allows one arm to come above the feed-way down which the bolts travel and the other arm to go below this way, thus insuring the pushing forward of the bolts without tilting them, and it also allows the retaining-spring K, heretofore spoken of, to act upon the incoming stream of bolts so as to prevent their entrance any faster than they are pushed forward by the feed-slide. The upper arm, $g^4$, of the feed-slide G$^2$ is usually made somewhat shorter than the lower arm, $d^5$, to compensate for the greater diameter at the head of the bolt.

Connected with the slotted crank H on the cross-shaft E is a pitman H', connected to the vibrating feed-plate H$^2$ in the hopper H$^3$. This hopper, as shown in Fig. 1, is supported upon the frame of the machine and is of the usual form of hoppers, so slanted that the material thrown into it shall run to the lowest part in the bottom. The feed-plate is pivoted on the frame of the machine just outside the hopper, and is vibrated by means of its pitman so as to play parallel with one of the sides of the hopper. When at its lower stroke, it falls beneath the bolts in the hopper, and on its upward stroke, as shown in Figs. 7 and 8, the bolts that are carried up by it fall over the edge of the hopper and are caught in a slot L, formed by one edge of the hopper and a parallel piece arranged beside it. This slot L is narrower than the head of the bolt, but wider than its shank, so that when the feed-plate brings up a bolt its head will be caught and the shank fall into the slot. The guide-ways forming this slot have sufficient pitch so that the bolts will readily follow down the incline. A pitch of about twenty-five degrees has been found sufficient with the different kinds of bolts with which I have experimented. When the guides forming the slot reach the vertical plane of the thread-cutting die, they turn sharply. The bolts at the place of the turn are held back by the spring K, so that only one bolt at a time will come within reach of the feed-slide $G^2$ to be forced forward to be operated upon. There is also mounted on the cross-shaft E a second eccentric M, carrying the adjustable pitman $M'$, for the purpose of raising the mechanism that will be hereinafter described for the pointing of the bolts.

Figures 3, 5:
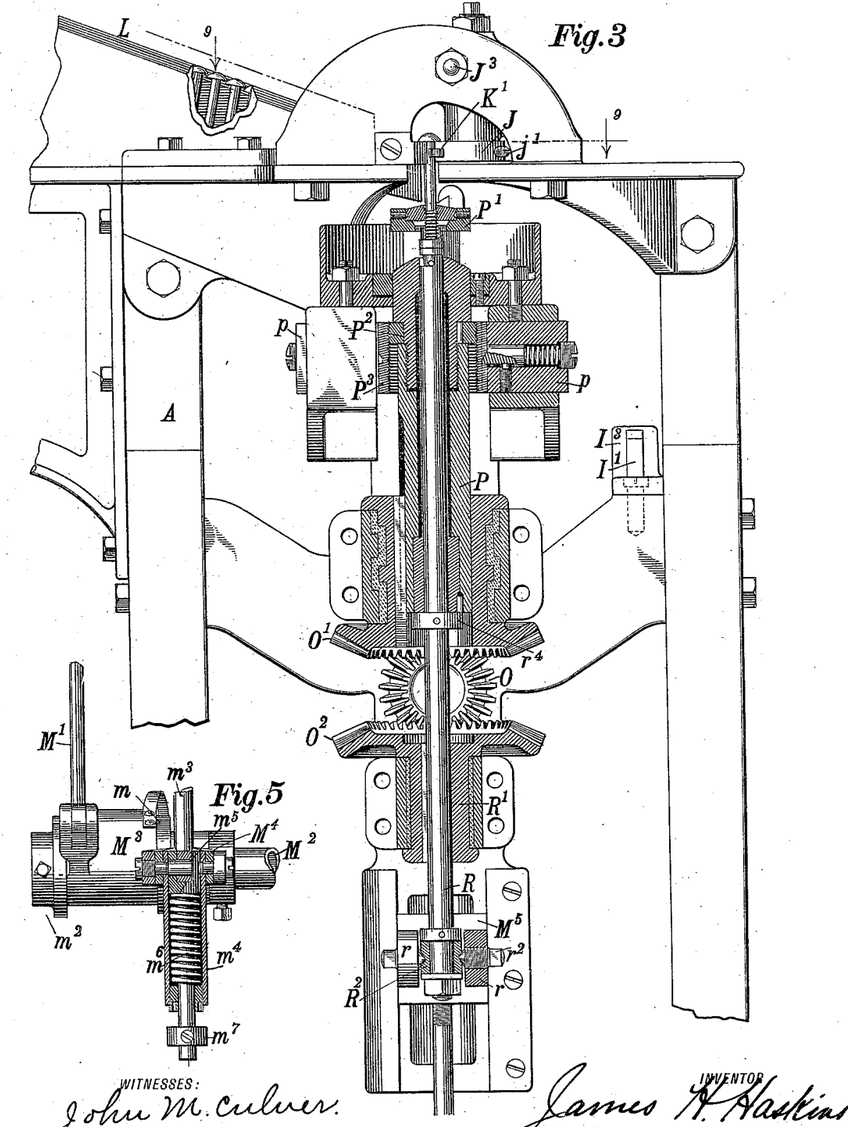
Fig. 3 is a vertical sectional view through the thread-cutting die, arbor, pointer, and their driving mechanisms, on line 3 3 of Fig. 1, just as the operation of cutting a thread and pointing the bolt is completed.
Fig. 5 is an enlarged detailed view, partly in section, of the mechanism for actuating the tool for pointing the bolt or rod.

The raising of the shaft that carries the pointer-cutter is accomplished by the connection of the pitman $M'$ to a sleeve $M^3$ that is loosely mounted on a cross-girt $M^2$ on the machine-frame. Fig. 5 of the drawings is an enlarged view of this device, and its application is shown in dotted lines in Fig. 1. The loosely-mounted sleeve $M^3$, to which the pitman $M'$ is attached, carries a spring-pressed pawl $m$, which engages with a tooth $m'$ on a loosely-mounted rock-lever $M^4$. There is located in the path of the pawl $m$ an unshipping-cam $m^2$, which causes the pawl to be released from the catch on the rock-lever after it has been rocked to the height required to point the bolt. The adjustment of the rock-lever $M^4$ to the shaft which carries the cutter that points the bolt is shown in Fig. 5, and consists of a connecting-rod $m^3$, which unites the end of the rock-lever $M^4$ with a sliding head $M^5$, that is attached to the shaft that carries the cutter that points the bolt. The sliding head $M^5$ is guided by ways on the frame of the machine.

The method of attaching the sliding head to the cutter-shaft will be explained in detail hereinafter.

It is readily seen that it is not always convenient to have the parts to be threaded and pointed of the same length, and this fact necessitates a device that will press the pointer with sufficient force to do its work, but still, with a long bolt, it may give way and not carry the cutter-shaft rigidly. This is accomplished by attaching the rock-lever $M^4$ to the connecting-rod $m^3$ by means of a sliding connection. The rock-lever $M^4$ is connected to a casing $m^4$, through which the connecting-rod $m^3$, which is jointed at $m^5$ to prevent any friction, passes. A spring $m^6$ is placed inside the casing through which the connecting-rod passes, and a screw-nut confines it in the casing. A collar $m^7$ is fixed upon the lower end of the connecting-rod.

It will readily be seen from this description and the drawings in the figures heretofore referred to that when the rock-lever $M^4$ is raised it draws up the casing, thus acting upon the spring, which transmits its force to the cutter-pointing shaft. When the pawl $m$ is unclutched, the parts drop of their own weight, the collar $m^7$ limiting the downward movement of the rock-lever $M^4$ and its connecting parts.

I have described the different devices for forwarding and holding the parts to be threaded and pointed and their means of adjustment, as well as other features on the machine, and will now describe the threading and pointing devices, together with the means of actuating them, going into the details of the construction which has seemed to me best for practical operation.

Figures 14, 15, 16, 17, 18:
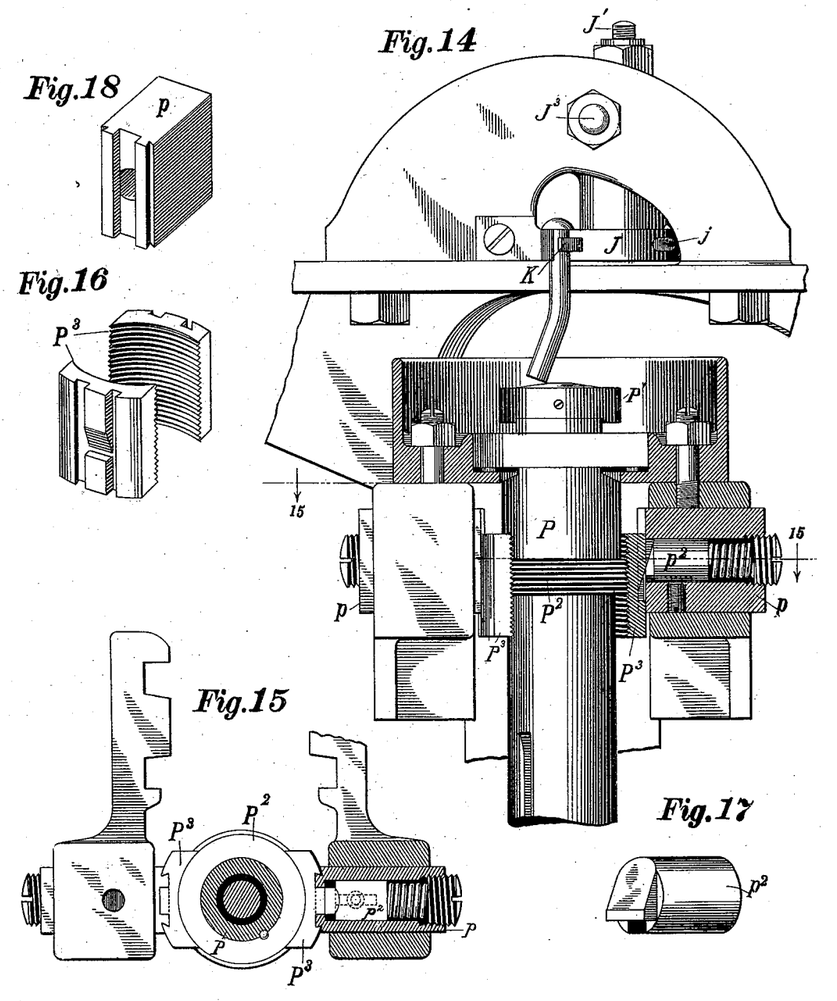
Fig. 14 is an enlarged view of a portion of Fig. 3, showing the safety device in action.
Fig. 15 is a part sectional view on line 15 15 of some of the parts shown in Fig. 14.
Fig. 16 is a view of the threaded cutter-feed blocks.
Fig. 17 is a perspective view of the safety-latch bolt which locks with the threaded cutter-feed blocks shown in Fig. 16.
Fig. 18 is a view of one of the guide-blocks.

The main shaft B extends through the machine and carries at its outer end a bevel-pinion O. This pinion meshes with companion bevel-wheels $O'$ $O^2$, the first of which actuates the thread-cutting die and the other the shaft which carries the cutter to do the pointing. These parts are mounted upon and arranged about a vertical shaft which has bearings on the frame of the machine directly beneath the bolt-holding mechanism, which has been heretofore described. The bevel-wheel $O'$ is splined to a hollow spindle P, which carries at its upper end the die $P'$ for cutting the thread. The die is fastened in the spindle by means of screws or bolts, as is common in such cases. This spindle is cut away beneath the die, as shown in Figs. 4 and 14. The waste metal escapes through these openings and prevents the machine from filling up.

As thus far explained, the bevel-wheel would rotate the die without bringing it to the bolt, and this I accomplish by means of a screw-feed, as follows: An externally-threaded feed-ring $P^2$ is sleeved upon the spindle, which ring meshes with the threaded blocks $P^3$, that partly embrace it. These threaded blocks are fixed on the frame of the machine in a way that will be hereinafter described. I have found it preferable, in order to get the threaded ring $P^2$ upon the spindle in the best shape, to separate the spindle, as shown in Fig. 3, then key the ring to one part of the spindle, and then connect the parts of the spindle by screwing them together. Other means are easy of mounting this ring; but this manner has been satisfactory in that it is easily taken apart for repair when worn. In the operation of the machine the rotation of the hollow spindle carries, because of the threaded ring just described, the die upwardly to the rigidly-held bolt, and the thread is cut. If, however, a bolt should be bent so that its shank would not enter the die, as shown in Fig. 14, unless a safety appliance was used, the machine would either be broken or the bolt badly bent. In order to accommodate such bolts that may be bent and any accidental holding of the bolt by the pinch-lever that may not be perpendicular, I mount the threaded blocks $P^3$ in guides $p$ on the machine-frame, so that they can slide in these guides. To prevent their sliding too freely, however, I mount in the guides spring-pressed pawls $p^2$, having beveled faces that fit into notches in the blocks $P^3$. These pawls are by means of set-screws turned against springs, pressed forward with sufficient force so that the blocks $p^3$ are held firmly enough to support and carry forward the hollow spindle P and enable it to do its work of cutting the thread. If, however, the bolt should not enter the die when the hollow spindle is brought against the bolt, the threaded blocks would give way, the pawl $p^2$ slipping from the notch, and even though the machine continued its forward movement the hollow spindle would not advance, and a possible accident would thus be prevented. The reverse motion of the spindle will draw it back, the bent bolt will be discharged, and the force of the springs on the pawls $p^2$ will, because of the bevel on the pawl and on the threaded blocks $P^3$, slide the blocks back into normal engagement with the pawls.

The bevel-wheel $O^2$ is loosely keyed or splined to a shaft R, that carries at its upper end the cutter that does the pointing of the bolts. This shaft is journaled within the hollow spindle P at its upper end, and the bevel-wheel, which is splined to it near its lower end, has a bearing R' on the framework of the machine. On the upper end of this shaft the bit that points the bolt is fastened in any of the usual well-known ways. The method of reciprocating this shaft has been heretofore explained; but the attachment of the sliding head $M^5$ to the shaft was not described. Ears $r$ from the sliding head extend outwardly to the side of the shaft R, and are bored and fitted with pointed set-screws $r^2$, that engage with depressions in a sleeve $R^2$ on the lower end of the shaft. This sleeve is held in place on the shaft by a collar above and by a bolt and nut below.

There are very decided advantages in mounting the pointing-cutter so that it will point the bolt before its removal from the die. Among the most important are the following: The die in its reverse movement will recut the thread if the bolt should by the pressure of the pointer become upset, or if a thread should be slivered or bent it will be straightened so that the nut will start easily. Again, the shaft R is revolved in the opposite direction from the spindle P, so that the bolt is not only relieved from the great torsional strain that would attend the threading and pointing at the same operation, but the liability of twisting that would follow each operation if performed separately is lessened by the reverse rotation of the cutters, as the strain of cutting the thread is counteracted by the strain of pointing. The pointer acts as a support for the end of the bolt, so that the bolt will not bend, and the thread-die performs the same office for the pointer. The advantages attendant on doing both operations at the same instant and with the same holding devices are too apparent to need explanation. A collar $r^4$, fixed to the shaft R at the lower end of the spindle P, is for the purpose of insuring that the shaft R be returned to its normal position after a bolt has been pointed, and it also prevents the advance of the pointer against the die in time of accident, as it allows of no movement of the parts relatively to each other beyond a fixed point.

A deflecting-chute S catches the bolts after they have dropped from the machine and conducts them to a receptacle.

It is readily seen that the powerful pinch-lever necessary for round-headed bolts is not essential for square-headed bolts, or those having square shanks. In Fig. 19 a modified construction of the pinch-lever is shown in which a holding-lever T is pivoted to the frame and forced forward by a spring-pressed bolt T'.

Figure 21:
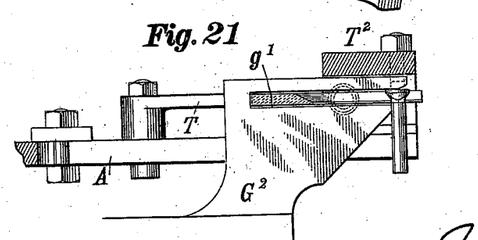
Fig. 21 is a sectional view of the modified form of the holding device shown in Fig. 19, particularly showing the bolt-feed and the spring-held holding-lever.
Figure 23:
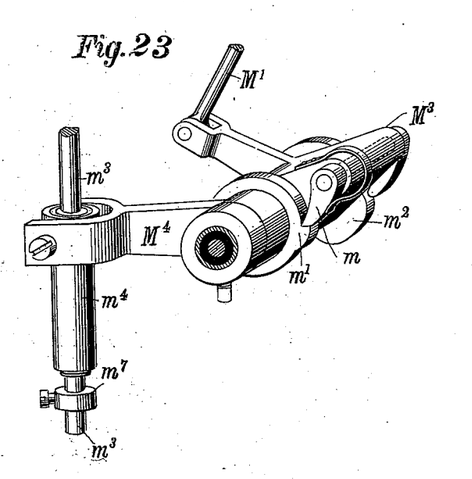
Fig. 23 is a perspective view of the connections for reciprocating the pointer, the pawl and its unshipping-cam being more clearly shown than in the former view.

The form of bolt shown in Figs. 19, 20, and 21 is extensively used in machine-building for countersunk holes, and it has a square shank which fits into the slot in the lever T and prevents the bolt from turning while the thread is being cut. The upward thrust of the bolt is prevented by the cap-piece $T^2$, bolted to the frame of the machine. A hardened jaw $t$ is fitted in the lever T to prevent wearing. In Fig. 22 another form of slot is shown when square-headed bolts are to be threaded, and consists in a square groove being cut in the cap-piece $T^2$.

Particular attention is called to the fact that the blanks to be acted upon are conducted from the hopper to the holder in a pendent position. They are slid forward along the horizontal part of the slotted feed-guide by the feed-plate, as has been heretofore pointed out, which, together with the pendent position of the blank in the slotted feed-guide, presents the blank to the holder in a vertical position. The die-carrying spindle and the pointer which are mounted upon the frame beneath the holder, and which are reciprocated vertically, act upon the blank more naturally than they would were the blank held horizontally. The blank to be acted upon can be with less mechanism and with more simple and practical devices brought into an alignment with the tools that are to act upon it, and the power can be applied to these tools, and they can also be rotated and reciprocated more simply and practically than as though they acted horizontally. I am not aware of an automatic machine of this kind that has presented the blanks to the holder in a vertical position and that has acted upon these blanks while thus held with tools that are vertically mounted upon the frame of the machine.

I do not intend to confine myself to the minutia of the construction here shown and described, my intention being only to show the best means of which I am now advised for carrying out my invention. Other means could be used to actuate some of the parts and other safety devices arranged to prevent breakage. I consider, however, that I am the first to build an automatic thread-cutting and pointing machine on the lines here shown and described, and that any equivalent constructions would fall under my invention.

It is readily seen that while the conjoint action of the threading and cutting mechanisms upon the bolt are desirable and that certain advantages arise from the combination of the threading and pointing devices still my machine can be built as a thread-cutter without the pointing attachment, or as a pointer for bolts that have already been threaded, and I consider that any such single use of the devices invented by me and shown and described in this specification would be a use of my invention. It is also plain that an attendant could feed the bolts into the machine without using the self-feed and hopper attachment, and while such use would dispense with these desirable devices still I consider that any use of the devices for threading and pointing, however the bolt may be positioned in the grasper, would be a use of my invention.

The blanks to be operated upon are shoveled into the hopper H³ (shown clearly in Fig. 2) and the power is applied to the machine through the fixed pulley C on the main cross-shaft B of the machine. The attendant, if he wishes to have the first action of the machine begin the operation upon the blanks, can fill with blanks the grooved or slotted slide by which they are fed to the holding-jaws of the machine, and the first reciprocation of the feed-slide G² will then push forward a blank, which will be grasped by the holding-lever J and held in a pendent position, to be acted upon by the die which is mounted in the spindle P, motion to which is transmitted from the main shaft D through the bevel-pinion O and bevel-wheel O'. The spindle P is reciprocated by the threads B², located on its periphery, which mesh with the threads in the blocks P³, that are yieldingly held on the machine-frame. Following this forward reciprocation of the spindle P comes the pointer mounted upon the shaft R, and acts upon the blank while it is still in the grasp of the holder and being threaded by the thread-die and does its work in the opposite direction, thus relieving the blank from the strain that would ensue from the double operation if both tools rotated in the same direction. When the desired length of thread and amount of pointing has been done, the belt-shifting device throws the belts onto the reverse pulleys, and the die and pointer back off while the holder-lever is released, running into another stretch in the cam-track F² on the wheel F, thus opening its jaws. The feed-slide again advances with another blank, which is pushed forward against the blank that has been operated upon, sliding it from the notch in the spring farther toward the point of the spring, which presses it against the beveled portion j× of the frame, and it is given a slight motion outwardly, which tends to throw it outside of the die-carrying spindle. In the meantime the reciprocating plate in the feed-hopper has kept up its reciprocations, dropping beneath the blanks in the hopper, lifting some of them upon the slotted feed-guide, into which they drop and slide toward the position where the feed-slide will engage them as it makes its reciprocation to feed forward a blank. This operation is repeated automatically, and if for any reason a blank should be misshapen and fail to be properly operated upon the safety devices which have been heretofore explained will be brought into operation and the breakage of the machine thus prevented.

Having now fully described my invention, what I claim, and desire to secure by Letters Patent, is—

1. In a thread-cutting and pointing machine, in combination, a blank-holder, a rotating reciprocating die-carrying spindle, and a rotating reciprocating pointer journaled in the die-carrying spindle, with means for reciprocating the die-carrying spindle that is provided with a safety device for both the spindle and the reciprocating pointer.

2. In combination, in a threading and pointing machine, a blank-holder, a rotating thread-cutting spindle which is reciprocated to and from its work, a pointer-spindle which is reciprocated to and from its work by means other than those which reciprocate the thread-cutting spindle, and a connection between the thread-cutting spindle and the pointer-spindle which prevents the movement of the pointer-spindle beyond a fixed point on the thread-cutting spindle.

3. In combination, in a threading and pointing machine, a blank-holder, a rotating thread-cutting spindle which is reciprocated to and from the bolt by a screw-movement that is provided with a safety-catch, a pointer-spindle which is reciprocated to and from the bolt by a flexible connecting device that allows bolts of different lengths to be pointed, and a stop on the pointer-shaft which prevents the movement of the pointer-spindle beyond the thread-cutting spindle.

4. In combination, in a threading-machine, a blank-holder, a rotating thread-cutting spindle, a screw threaded on its periphery, companion threads on blocks mounted upon the machine-frame, and spring-pressed dogs engaging the blocks, substantially as and for the purpose described.

5. In combination, in a threading and pointing machine, a blank-holder, a rotating thread-cutting spindle which is reciprocated to and from its work to the length desired for the thread, a safety device for the thread-cutting die, and a rotating thread-cutting pointer fed against the bolt by an actuating device one element of which is flexible, substantially as and for the purpose described.

6. In combination in a machine for threading blanks, a horizontal main shaft, on which are mounted the shifting pulleys at one end, and at the other the gears that mesh with and give motion to a vertical spindle, which carries the tools to operate upon the blanks, a horizontal shaft located on the frame practically at right angles to the main shaft, and driven therefrom, a holder above the vertical spindle, a slotted feed-guide extending from a hopper to this holder, a reciprocating feed-slide to carry the blanks along the slotted guideway to the holder, and means mounted upon the cross-shaft to actuate the devices that control the power, the feed-slide in the hopper, the feed-slide to the holder, the holder and the rotation and reciprocations of the dies that act upon the blanks, substantially as and for the purpose specified.

7. In combination in a blank-threading machine to form a feeding device therefor, a hopper, an inclined slotted feed-guide, means for getting the blanks from the hopper into the slotted guide, a spring obstructing the path of the slotted guide at the bottom of its inclined portion, a reciprocating feed-slide located in a plane at an angle to the slotted feed-guide and bifurcated so that one arm may pass above the slotted feed-guide and the other below it, substantially as and for the purpose specified.

8. In combination in a blank-threading machine to form the feeding device, an inclined slotted feed-guide, the delivery end of which is bent at an angle to the inclined portion, an obstruction in the path of the slot at its angle, a reciprocating feed-slide located in the same plane as the delivery portion of the slotted feed-guide and reciprocated the length of the bent portion of the guide whereby its rearward movement allows the stream of bolts to slide against the obstruction in the guide and its forward movement to engage one of the blanks and press it past the obstruction, substantially as and for the purpose described.

9. In combination in a blank-threading machine, a slotted feed-guide, a feed-slide, means obstructing the flow of the blanks in the slot past which the feed-slide carries a single blank at each reciprocation, a secondary spring, into the grasp of which the feed-slide forces the blanks at the end of its reciprocation, substantially as and for the purpose described.

10. In combination in a blank-threading machine, a slotted feed-guide, a feed-slide, a spring obstructing the flow of blanks in the slotted guide, past which spring the feed-slide carries a single blank at each reciprocation, and a secondary spring into the grasp of which the feed-slide forces the blank at the end of its reciprocation and from which grasp the incoming blank forces the outgoing blank, its discharge being accelerated by the spring.

11. In combination in a blank-threading machine to form the feeding device for the blanks, a hopper, a continuous slotted feed-slide, extending from the hopper to the holder, means for getting the blanks from the hopper into the feed-slide and a reciprocating feed-slide provided with a safety device.

12. In combination in a feeding device for blanks, in a blank-threading machine, a continuous slotted feed-guide extending from the hopper to the blank-holder, a feed-slide located in a plane at an angle to the slotted guide, and a connection from an actuated part of the machine to the slide consisting of a connecting-rod having a spring as one of its elements, substantially as and for the purpose specified.

13. In a machine to thread and point blanks in combination a main shaft extending horizontally across the machine and fitted at one end with fixed and loose pulleys and at the other with a bevel-pinion, a cross-shaft extending across the machine and actuated from the main shaft by a screw-gear, a vertical thread-cutting cylinder and a pointer-cutting shaft journaled therein and both actuated from the main shaft by the bevel-pinion mounted thereon, a hopper and a feed-slot therefrom to the holder located above and in the same vertical plane as the cutter and pointer, substantially as shown and described.

14. In combination, in a machine for threading and pointing bolts to form the reciprocating device for the pointer, a crank located on a revolving shaft of the machine, a connecting-rod from the crank to a lever pivoted on the machine-frame, a pawl on this lever engaging a catch on a secondary lever also mounted on the machine-frame, an unshipping-cam located on the machine in the path of the pawl, and a spring-link connection between the secondary lever and the pointer-shaft, whereby the motion imparted by the crank is flexibly transmitted to the pointer-shaft, substantially as and for the purpose specified.

JAMES H. HASKINS.

Witnesses:
JOHN M. CULVER,
GEORG WEISS.